(12) United States Patent
Shimizu et al.

(10) Patent No.: US 11,892,395 B2
(45) Date of Patent: Feb. 6, 2024

(54) OPTICAL MEASUREMENT CELL AND OPTICAL ANALYSIS DEVICE

(71) Applicant: HORIBA STEC, Co., Ltd., Kyoto (JP)

(72) Inventors: Toru Shimizu, Kyoto (JP); Takeshi Akamatsu, Kyoto (JP)

(73) Assignee: HORIBA STEC, CO., LTD., Kyoto (JP)

( * ) Notice: Subject to any disclaimer, the term of this patent is extended or adjusted under 35 U.S.C. 154(b) by 212 days.

(21) Appl. No.: 17/447,605

(22) Filed: Sep. 14, 2021

(65) Prior Publication Data

US 2022/0099561 A1 Mar. 31, 2022

(30) Foreign Application Priority Data

Sep. 28, 2020 (JP) ................. 2020-161762

(51) Int. Cl.
 *G01N 21/05* (2006.01)
 *G01N 21/3504* (2014.01)
 *G01N 21/03* (2006.01)

(52) U.S. Cl.
 CPC ......... *G01N 21/05* (2013.01); *G01N 21/3504* (2013.01); *G01N 2021/0389* (2013.01)

(58) Field of Classification Search
 CPC ............... G01N 21/05; G01N 21/3504; G01N 2021/0389
 See application file for complete search history.

(56) References Cited

U.S. PATENT DOCUMENTS

| 5,621,510 A * | 4/1997 | Okuda ................. G03G 15/206 |
| | | 399/338 |
| 2017/0052115 A1* | 2/2017 | Hayashi ................. G01N 21/05 |

FOREIGN PATENT DOCUMENTS

JP 2017040655 A 2/2017

* cited by examiner

*Primary Examiner* — Jamil Ahmed
(74) *Attorney, Agent, or Firm* — Alleman Hall Creasman & Tuttle LLP

(57) ABSTRACT

The present invention reduces thermal stress that is generated in a join portion of a window material in an optical measurement cell, and is an optical measurement cell having translucent windows through which light is transmitted and into an interior of which is introduced a test sample. This optical measurement cell has a planar window material that forms the translucent windows, a join supporting portion that is joined to an outer edge portion of a main surface of the window material and supports the window material, and a low thermal expansion component that is provided on an outer-side circumferential surface of the join supporting portion and whose coefficient of thermal expansion is lower than a coefficient of thermal expansion of the join supporting portion.

9 Claims, 8 Drawing Sheets

PERSPECTIVE VIEW

FRONT VIEW

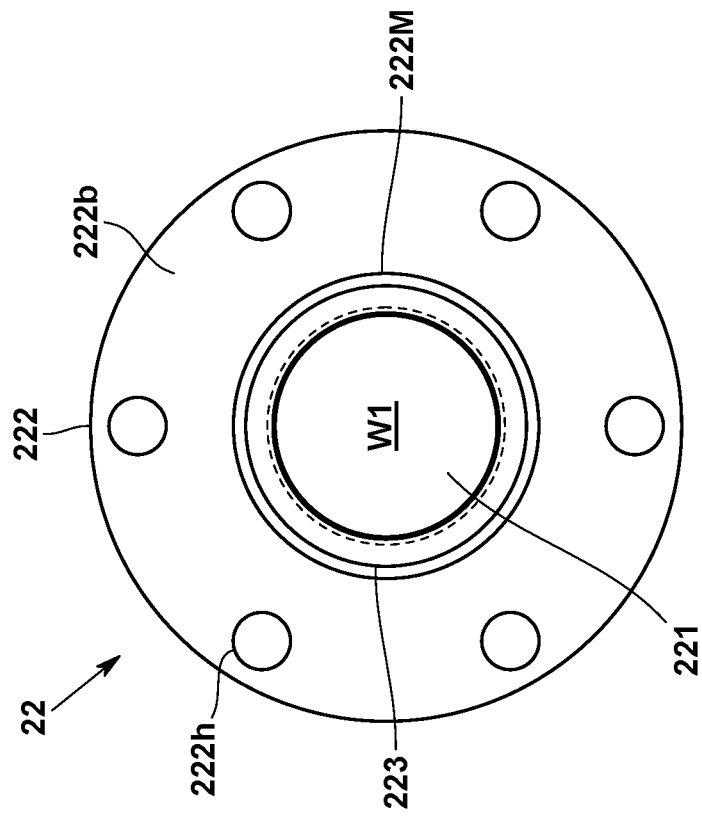
FIG. 2(b) FRONT VIEW
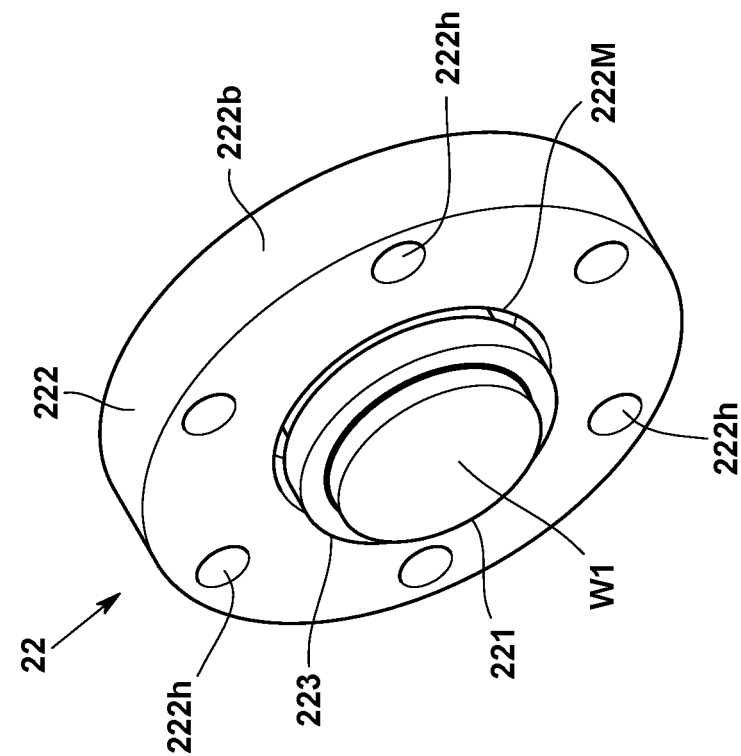
FIG. 2(a) PERSPECTIVE VIEW

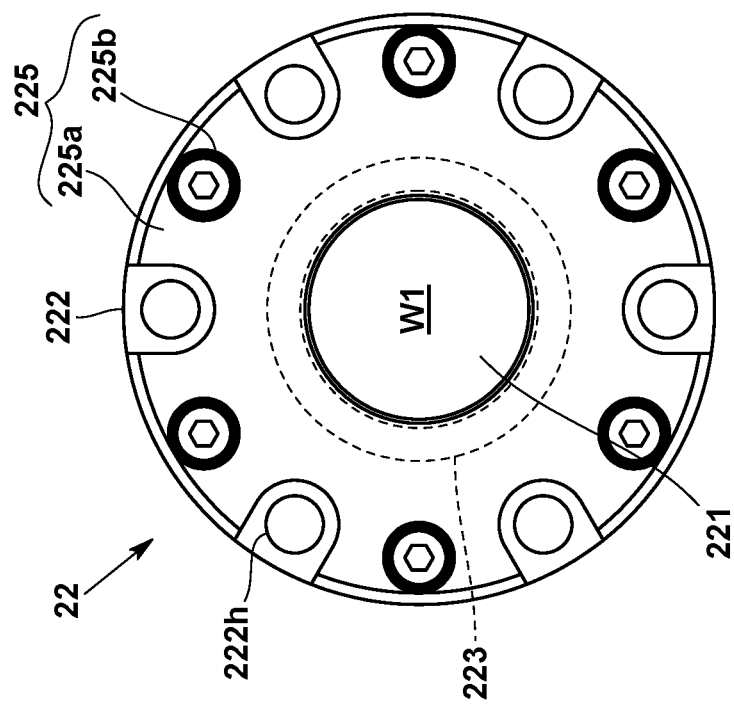
FIG. 4(b) FRONT VIEW
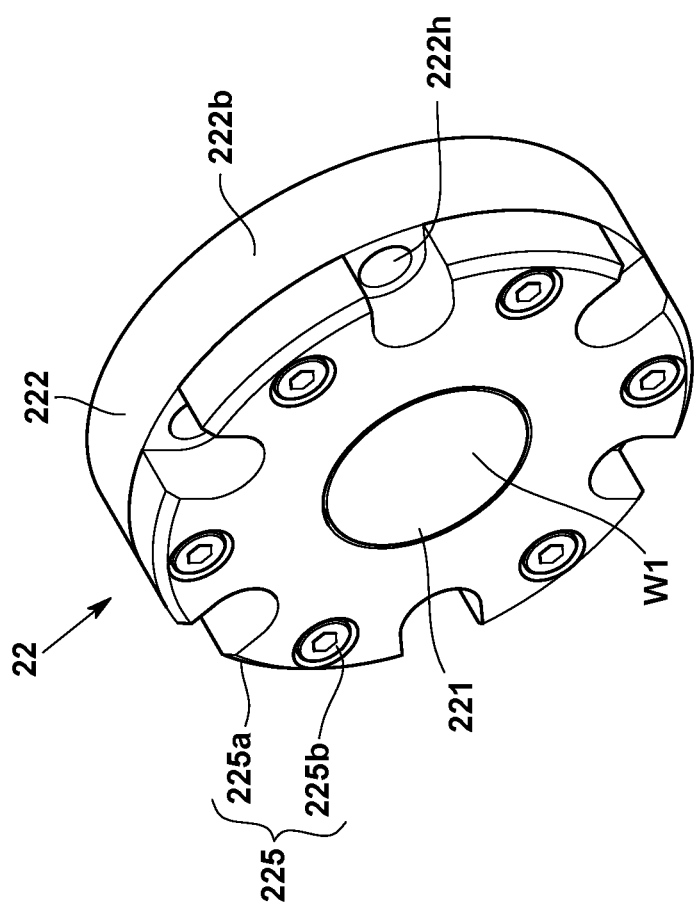
FIG. 4(a) PERSPECTIVE VIEW

CONVENTIONAL TECHNOLOGY

OPTICAL MEASUREMENT CELL AND OPTICAL ANALYSIS DEVICE

TECHNICAL FIELD

The present invention relates to an optical measurement cell and to an optical analysis device that employs this optical measurement cell.

TECHNICAL BACKGROUND

Conventionally, as is shown in Patent Document 1, an optical measurement cell that is used in an optical analysis device such as, for example, an NDIR or the like and that has a structure in which a window forming component having a window material is attached to a cell main body is known.

Here, in a case in which an O-ring is used as a structure to fix the window material onto the window forming component via an airtight seal, even though the quantity thereof is only slight, a small amount of gas still permeates through the O-ring, thereby preventing an extremely airtight seal from being obtained. Moreover, in a case in which the gas is one having reactive properties, then the O-ring may also become degraded by the gas. For this reason, as is shown in FIG. 8, a structure is known that enables a joining portion that is formed on a flange component to be joined to a flat surface portion (i.e., a main surface) of the window material.

However, due to differences between a coefficient of thermal expansion of the material (for example, stainless steel) forming the flange component and a coefficient of thermal expansion of the material (for example, zinc selenide) forming the window material, thermal stress may be generated in the join portion between the window material and the joining portion. As a result of this, there is a possibility of the join portion between the window material and the joining portion becoming fractured, or of the window material itself becoming fractured.

DOCUMENTS OF THE PRIOR ART

Patent Documents

Patent Document 1
Japanese Unexamined Patent Application (JP-A) No. 2017-40655

DISCLOSURE OF THE INVENTION

Problems to be Solved by the Invention

The present invention was conceived in order to solve the above-described problems, and it is a principal object thereof to reduce thermal stress that is generated in a join portion of a window material in an optical measurement cell.

Means for Solving the Problem

In other words, an optical measurement cell according to the present invention is an optical measurement cell having translucent windows through which light is transmitted and into an interior of which is introduced a test sample, and is characterized in being provided with a planar window material that forms the translucent windows, a join supporting portion that is joined to an outer edge portion of a main surface of the window material and supports the window material, and a low thermal expansion component that is provided on an outer-side circumferential surface of the join supporting portion and whose coefficient of thermal expansion is lower than a coefficient of thermal expansion of the join supporting portion.

If an optical measurement cell is formed in this manner, then because the low thermal expansion component whose coefficient of thermal expansion is lower than the coefficient of thermal expansion of the join supporting portion that is joined to the translucent windows is provided on the outer-side circumferential surface of this join supporting portion, deformation that might be caused by the thermal expansion of the join supporting portion is suppressed, and it is possible to reduce any thermal stress that might be generated in the join portion between the window material and the join supporting portion. As a result, it is possible to prevent fracturing of the join portion between the window material and the join supporting portion, and to prevent fracturing of the window material itself.

In order to further reduce any deformation that might be caused by the thermal expansion of the join supporting portion, it is desirable that the low thermal expansion component be provided in such a way as to be in close contact with the outer-side circumferential surface of the join supporting portion.

In order to enable the low thermal expansion component to be in close contact with the outer-side circumferential surface of the join supporting portion while also enabling the number of parts used in the optical measurement cell to be reduced (for example, parts that might be used to fix the low thermal expansion component in position), it is desirable that the low thermal expansion component be fitted together with the outer-side circumferential surface of the join supporting portion.

Moreover, as a structure that is used to enable the low thermal expansion component to be in close contact with the outer-side circumferential surface of the join supporting portion, it is desirable that the outer-side circumferential surface of the join supporting portion have a first inclined surface whose external dimensions progressively increase the further the first inclined surface is from the window material, and that an inner-side circumferential surface of the low thermal expansion component have a second inclined surface that corresponds to the first inclined surface of the join supporting portion, and that the optical measurement cell be further provided with a fixing mechanism that, in a state in which the first inclined surface of the join supporting portion and the second inclined surface of the low thermal expansion component are in close contact with each other, fixes the low thermal expansion component in position.

As the optical measurement cell of the present invention, an optical measurement cell that is further provided with a flange portion that is provided so as to be continuous with the join supporting portion in such a way as to surround the window material may be considered. This flange portion is mounted on a cell main body of the optical measurement cell.

In this structure, in order to inhibit thermal stress that is caused by thermal expansion of the flange portion from being generated in the join portion between the window material and the join supporting portion, it is desirable that an annular groove be formed in a surface of the flange portion located on the join supporting portion side thereof so as to surround the join supporting portion.

It is desirable that a wall thickness of an inner-side wall portion that is located on an inner side of the groove in the flange portion be smaller than a wall thickness of the join supporting portion.

If this structure is employed, then because the wall thickness of the join supporting portion is made larger and the wall thickness of the inner-side wall portion is made smaller, it is possible to suppress any increase in thermal stress in the join portion between the window material and the join supporting portion that is caused by thermal expansion of the flange portion, while also enabling the surface area of the join between the window material and the join supporting portion to be increased.

It is desirable that a thermal deformation absorbing portion be provided in a bottom portion of the groove in the flange portion.

If this structure is employed, then because the thermal expansion of the outer-side portion of the groove in the flange portion is absorbed by the thermal deformation absorbing portion, it is possible to further reduce any thermal stress that might be generated in the join portion between the window material and the join supporting portion.

In the case of a structure in which the low thermal expansion component covers the outer-side circumferential surface of the window material, there is a possibility that excessive thermal stress will be applied to the window material by the low thermal expansion component. In order to satisfactorily solve this problem, it is desirable that the low thermal expansion component not be located on a side of the outer-side circumferential surface of the window material. In other words, it is desirable that the low thermal expansion component not cover the outer-side circumferential surface of the window material.

Moreover, an optical analysis device according to the present invention is characterized in being provided with the above-described optical measurement cell, a light-irradiating portion that irradiates light onto the optical measurement cell, a light-detecting portion that detects light that has been transmitted through the optical measurement cell, and a concentration calculation portion that calculates concentrations of components contained in the test sample using light intensity signals obtained by the light-detecting portion.

Effects of the Invention

According to the above-described present invention, it is possible to reduce thermal stress that is generated in a join portion of a window material in an optical measurement cell.

BRIEF DESCRIPTION OF THE DRAWINGS

FIG. 2 (*a*) is a perspective view and FIG. 2(*b*) is a front view showing a structure of a window forming component of the same embodiment.

FIG. 4 (*a*) is a perspective view and FIG. 4(*b*) is a front view showing a structure of a window forming component of a variant embodiment.

BEST EMBODIMENTS FOR IMPLEMENTING THE INVENTION

Hereinafter, a gas analysis device according to an embodiment of the present invention will be described with reference to the drawings.

1. Overall Structure

A gas analysis device 100 of the present embodiment is a device that analyzes components in a test gas using, for example, a non-dispersive infrared absorption method (NDIR). Note that a material gas used in a semiconductor manufacturing process or an exhaust gas expelled from an internal combustion engine or the like may be considered as the test gas.

Figure 1:
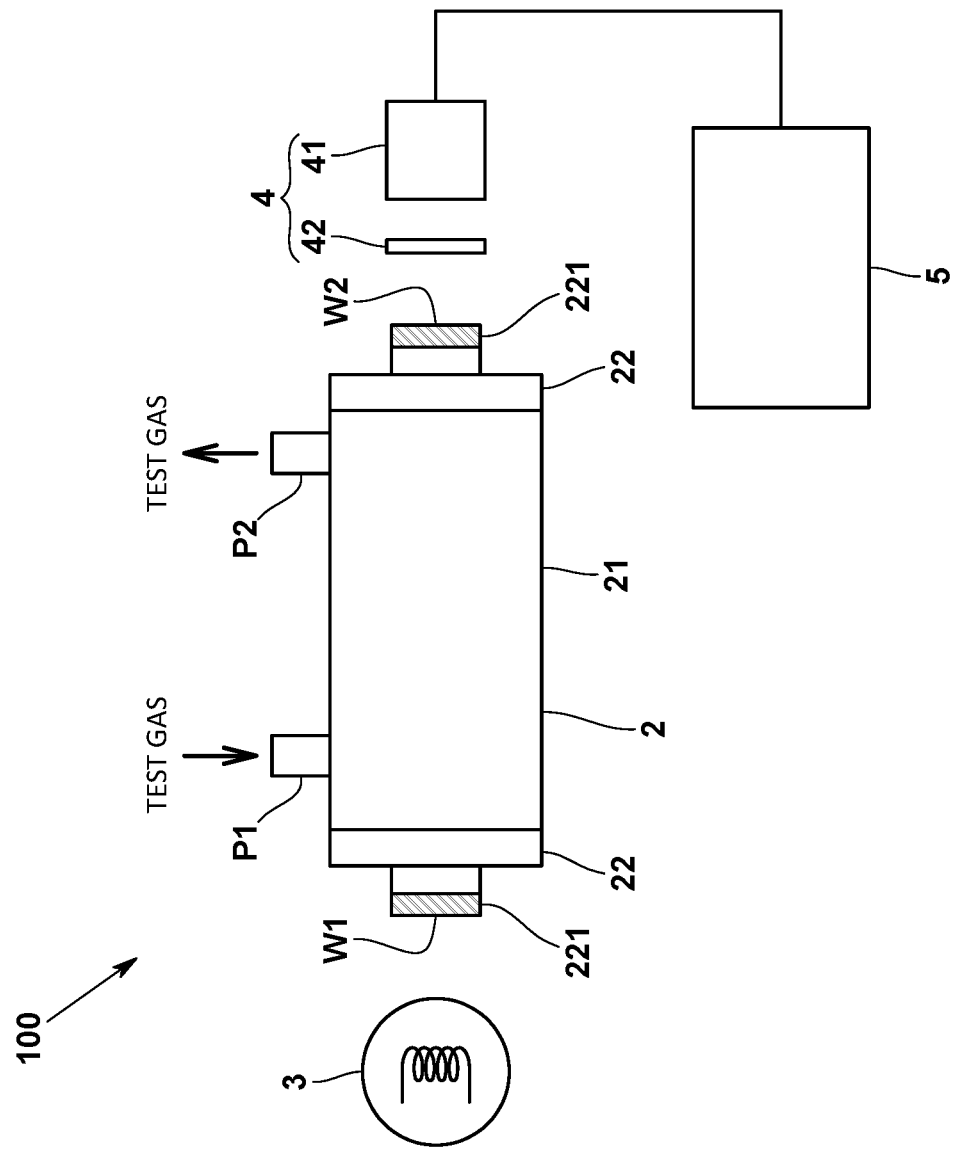
FIG. 1 is an overall schematic view of a gas analysis device according to an embodiment of the present invention.

More specifically, as is shown in FIG. 1, the gas analysis device 100 is provided with an optical measurement cell 2 into which a test gas is introduced, a light-irradiating portion 3 that irradiates infrared light onto the optical measurement cell 2, a light-detecting portion 4 that detects the infrared light transmitted through the optical measurement cell 2, and a concentration calculation portion 5 that calculates concentrations of components contained in the test gas using light intensity signals obtained by the light-detecting portion 4.

The optical measurement cell 2 has a pair of translucent windows W1 and W2 through which infrared light is transmitted. The optical measurement cell 2 is a flow cell type of device into which a test gas is introduced via an introduction port P1, and from which the test gas is discharged via a discharge port P2.

More specifically, the optical measurement cell 2 has a cell main body 21 in which the introduction port P1 and the discharge port P2 are provided, and window materials 221 that form the translucent windows W1 and W2, and also has window forming components 22 that are fixed to the cell main body 21. Note that a structure of the window forming components 22 of the optical measurement cell 2 is described below in detail.

The light-irradiating portion 3 is a device that irradiates infrared light onto the optical measurement cell 2 and is formed, for example, by an infrared lamp. It is also possible for the light-irradiating portion 3 to be formed by an LED that emits infrared light. Infrared light emitted from the light-irradiating portion 3 passes through the one translucent window W1 of the optical measurement cell 2, travels through the internal space inside the optical measurement cell 2, then passes through the other translucent window W2 and is detected by the light-detecting portion 4.

The light-detecting portion 4 is a device that detects infrared light that has traveled through the optical measurement cell 2, and has a photodetector 41 that detects the infrared light exiting through the other translucent window W2 of the optical measurement cell 2, and a wavelength selection filter 42 that is provided on an optical path between the other translucent window W2 and the photodetector 41, and that only allows a portion of the infrared light that has a certain wavelength out of the irradiated infrared light to pass through itself. Light intensity signals obtained by the photodetector 41 are output to the concentration calculation portion 5.

The concentration calculation portion 5 is a device that calculates concentrations of predetermined components contained in a test gas using the light intensity signals obtained by the photodetector 41. More specifically, the concentration calculation portion 5 calculates a light absorption from the light intensity signals, and determines partial pressures of predetermined components contained in a test gas based on this light absorption and on a previously created calibration curve that is recorded in memory. Additionally, the concentration calculation portion 5 calculates concentrations of predetermined components (=the partial pressure of a predetermined component/the total pressure of the test gas) based on the total pressure of the test gas within the optical measurement cell 2 that has been measured by the optical measurement cell 2 or by pressure gauges (not shown in the drawings) provided in pipes on the upstream and downstream sides of the optical measurement cell 2. Note that the concentration calculation portion 5 is able to perform the functions thereof by means of a computer that is formed so as to include, for example, a CPU, memory, an AD converter, and input and output interfaces and the like.

2. Detailed Structure of the Window Forming Component 22 of the Optical Measurement Cell 2

Next, the structure of the window forming components 22 of the optical measurement cell 2 will be described in detail.

Note that because the detailed structure of the window forming component 22 forming the one translucent window W1 is either the same as or similar to the detailed structure of the window forming component 22 forming the other translucent window W2, the detailed structure of the window forming component 22 forming the one translucent window W1 is described below as representative of both.

Figure 3:
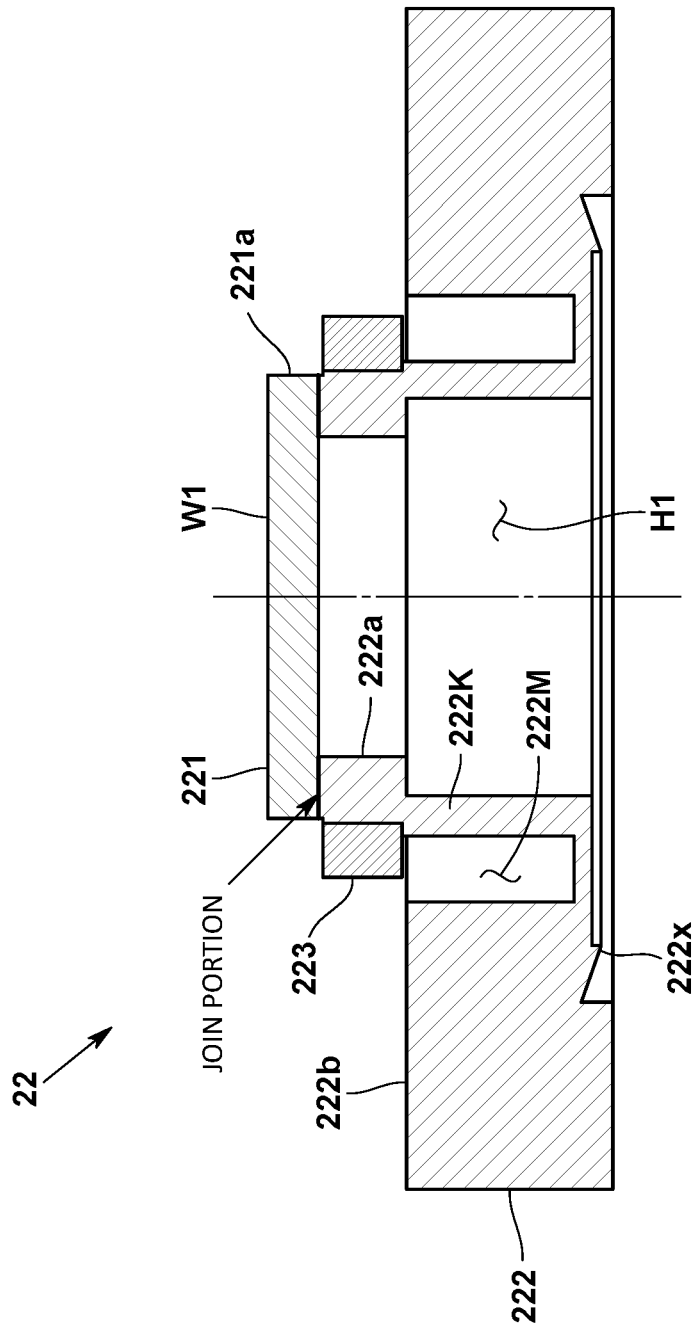
FIG. 3 is a cross-sectional view showing the structure of the window forming component of the same embodiment.

As is shown in FIGS. 2(a)-2(b) and FIG. 3, the window forming component 22 has the planar window material 221 that forms the translucent window W1, and a supporting body 222 that supports the window material 221 by being joined to this window material 221.

The window material 221 is formed from a material through which infrared light is able to be transmitted, and is a flat plate that is formed in a circular shape when looked at in plan view. The window material 221 of the present embodiment is formed from zinc selenide.

As is shown in FIG. 3 in particular, the supporting body 222 has a cylindrical join supporting portion 222a that supports the window material 221, and a flange portion 222b that is provided so as to be continuous with the join supporting portion 222a in such a way as to surround the window material 221. In addition, a transmission hole H1 through which the infrared light that has passed through the window material 221 is transmitted is formed in a central portion of the supporting body 222. Furthermore, in the present embodiment, the join supporting portion 222a and the flange portion 222b are formed as a single integrated body, and the supporting body 222 is formed, for example, from stainless steel.

The join supporting portion 222a is a portion that is joined to an outer edge portion of a main surface (i.e., a planar portion) of the window material 221, and is formed in a circular cylinder configuration in the present embodiment. In other words, the window material 221 is joined to one end surface in an axial direction of the join supporting portion 222a. Note that, for example, diffusion welding or braze welding or the like can be used to join these materials together.

The flange portion 222b has the join supporting portion 222a provided on one surface thereof, and is formed having an annular configuration in the present embodiment. This flange portion 222b is mounted on the cell main body 21 via, for example, a metal gasket (not shown in the drawings), and an ICF Standard knife edge portion 222x is formed on an attachment surface of the flange portion 222b that is attached to the cell main body 21. In addition, a plurality of through holes 222h that are used to screw the flange portion 222b onto the cell main body 21 are formed around the circumferential direction of the flange portion 222b.

An annular groove 222M is formed in a surface of the flange portion 222b on the join supporting portion 222a side thereof (i.e., in the surface on the opposite side from the attachment surface) in such a way as to surround the join supporting portion 222a. Here, the groove 222M is formed having an annular configuration that is coaxial with the join supporting portion 222a. This groove 222M inhibits thermal stress that is caused by thermal expansion of the flange portion 222b from being generated in the join portion between the window material 221 and the join supporting portion 222a. A depth for the groove 222M that, for example, is equal to not less than half of the plate thickness of the flange portion 222b may be considered.

Here, a wall thickness (i.e., a radial thickness) of an inner-side wall portion 222K that is located on the inner side of the groove 222M in the supporting body 222 is formed so as to be less than a wall thickness (i.e., a radial thickness) of the join supporting portion 222a. As a consequence, by making the wall thickness of the join supporting portion 222a larger and making the wall thickness of the inner-side wall portion 222K smaller, it is possible to inhibit thermal stress that is caused by thermal expansion of the flange portion 222b from being generated in the join portion between the window material 221 and the join supporting portion 222a, while also enabling the surface area of the join between the window material 221 and the join supporting portion 222a to be increased.

In addition, as is shown in FIGS. 2(a)-2(b) and FIG. 3, the window forming component 22 of the present embodiment has a low thermal expansion component 223 that is provided on an outer-side circumferential surface of the join supporting portion 222a.

This low thermal expansion component 223 is provided in such a way as to be in close contact with the outer-side circumferential surface of the join supporting portion 222a and is formed having, for example, an annular configuration. Note that the low thermal expansion component 223 is formed in such a way as to be in close contact with the join supporting portion 222a, while not being in contact with the outer-side circumferential surface 221a of the window material 221. In other words, the low thermal expansion component 223 is not located at the side of the outer-side circumferential surface 221a of the window material 221, and is formed in such a way as to not cover the outer-side circumferential surface 221a of the window material 221 (see FIG. 3). As a consequence, at the same time as thermal expansion of the join supporting portion 222a is restricted, excessive thermal stress is prevented by the low thermal expansion component 223 from being directly generated in the window material 221.

Moreover, the low thermal expansion component 223 is formed from a material having a coefficient of thermal expansion that is lower than a coefficient of thermal expansion of the join supporting portion 222a (i.e., of the supporting body 222). A metal such as, for example, Titanium, Kovar, or Invar or the like can be used for the low thermal expansion component 223. Note that, in addition to the aforementioned metals, quartz or sapphire of the like may also be used for the low thermal expansion component 223.

This low thermal expansion component 223 is fitted onto the outer-side circumferential surface of the join supporting portion 222a. The low thermal expansion component 223 may be fitted by means of, for example, heat-fitting in which the low thermal expansion component 223 is heated and then fitted around the outer-side circumferential surface of the join supporting portion 222a, or by means of cold-fitting in which the join supporting portion 222a (i.e., the supporting body 222) is cooled and the low thermal expansion component 223 then fitted around the outer-side circumferential surface of the join supporting portion 222a.

3. Effects of the Present Embodiment

According to the gas analysis device 100 of the present embodiment which is formed in the manner described above, because the low thermal expansion component 223, whose coefficient of thermal expansion is lower than the coefficient of thermal expansion of the join supporting portion 222a, is provided on the outer-side circumferential surface join supporting portion 222a that is joined to the translucent windows W1 and W2, any deformation that might be caused by the thermal expansion of the join supporting portion 222a is suppressed, and it is possible to reduce any thermal stress that might be generated in the join portion between the window material 221 and the join supporting portion 222a. As a result, it is possible to prevent fracturing of the join portion between the window material 221 and the join supporting portion 222a, and to prevent fracturing of the window material 221 itself.

4. Additional Embodiments

Figure 5:
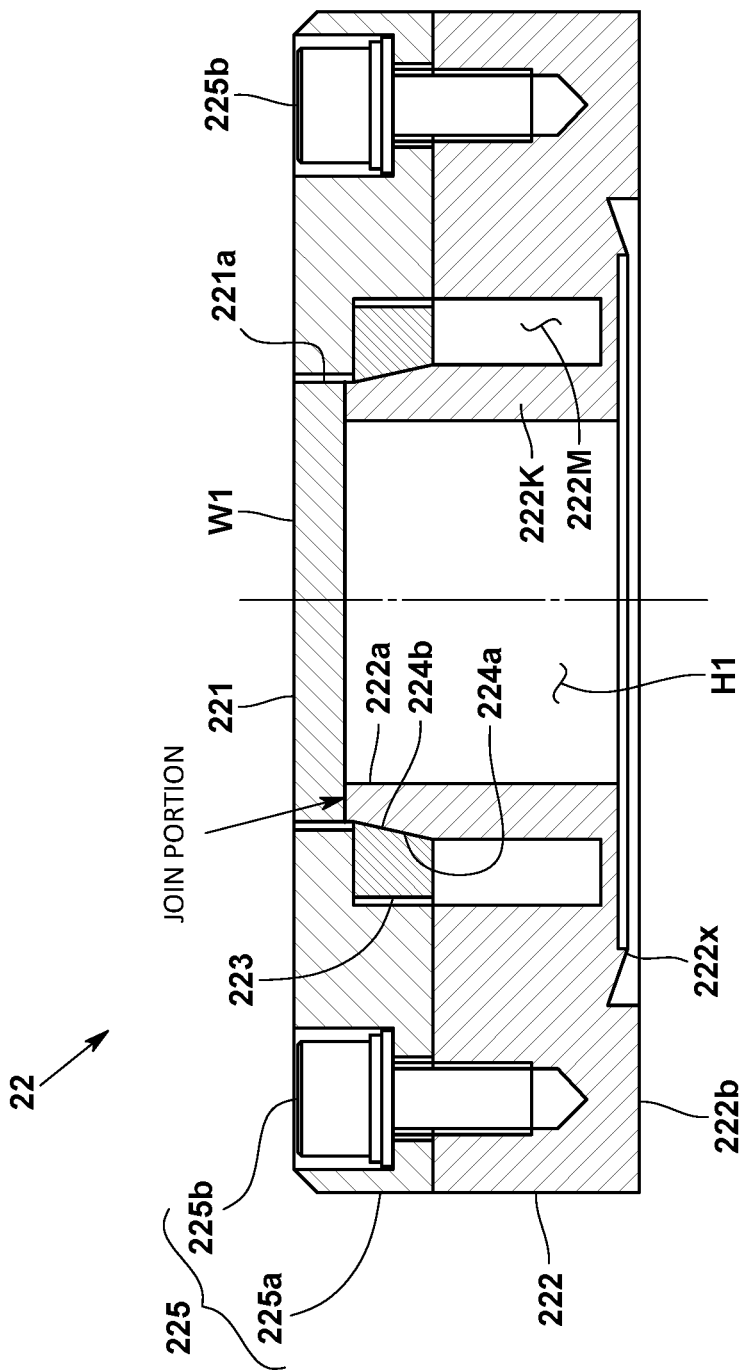
FIG. 5 is a cross-sectional view showing a structure of a window forming component of a variant embodiment.

Instead of employing heat-fitting or cold-fitting for the fixing structure for the low thermal expansion component 223, it is also possible, for example, to fix the low thermal expansion component 223 in position using a fastening method. More specifically, as is shown in FIGS. 4(a)-4(b) and FIG. 5, it is also possible to form a first inclined surface (i.e., a first tapered surface) 224a on the outer-side circumferential surface of the join supporting portion 222a. This first inclined surface 224a is formed in such a way that an external dimension of the outer-side circumferential surface becomes progressively larger the further it is from the window material 221. In addition, a second inclined surface (i.e., a second tapered surface) 224b that corresponds to the first inclined surface 224a of the join supporting portion 222a is formed on an inner-side circumferential surface of the low thermal expansion component 223. In a state in which the first inclined surface 224a of the join supporting portion 222a and the second inclined surface 224b of the low thermal expansion component 223 are in close contact with each other, the low thermal expansion component is fixed in place by a fixing mechanism 225. Here, the fixing mechanism 225 is formed by a pressing component 225a whose purpose is to press the low thermal expansion component 223 against the flange portion 222b side, and fixing screws 225b whose purpose is to fasten the pressing component 225a onto the flange portion 222b.

Figure 6:
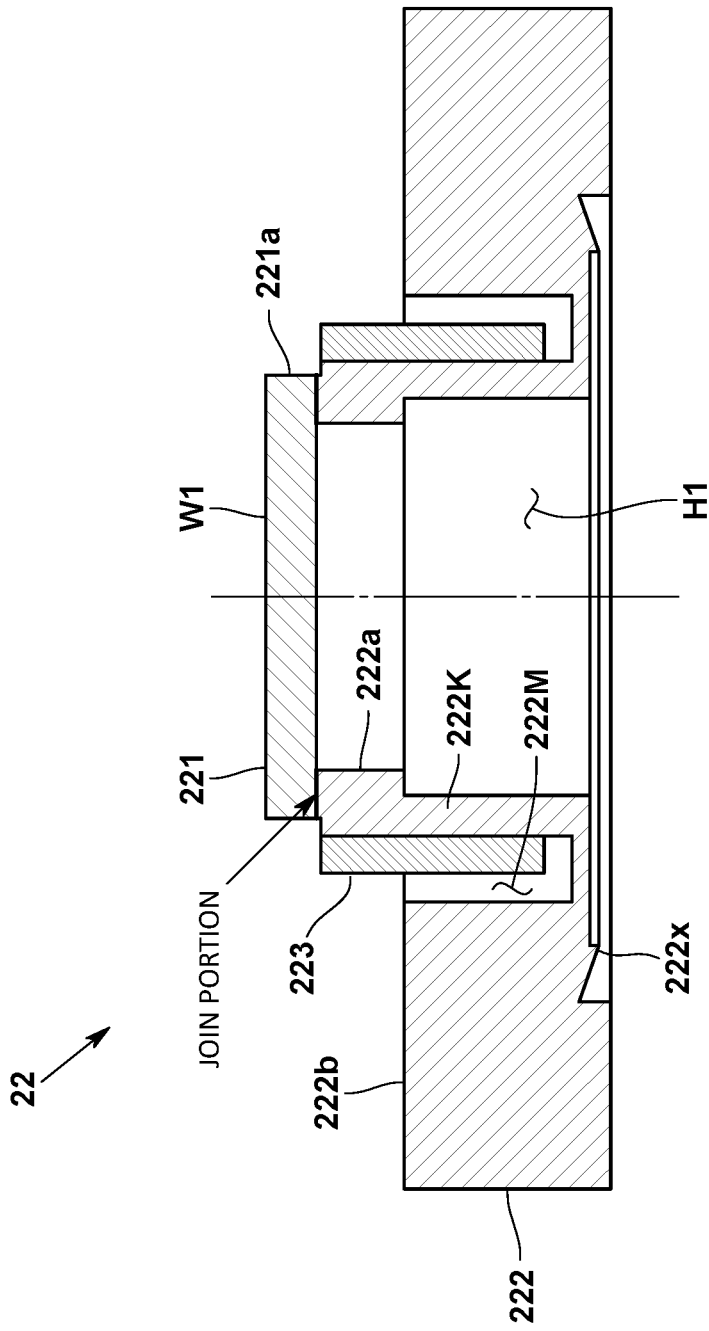
FIG. 6 is a cross-sectional view showing a structure of a window forming component of a variant embodiment.

Moreover, as is shown in FIG. 6, it is also possible to employ a structure in which the low thermal expansion component 223 is provided within the groove 222M as well, so that the low thermal expansion component 223 is in close contact not only with the outer-side circumferential surface of the join supporting portion 222a, but also with the inner-side circumferential surface of the inner-side wall portion 222K. By employing this structure, it is possible to further inhibit any deformation that might be caused by the thermal expansion of the join supporting portion 222a, and to further reduce thermal stress that is generated in the join portion between the window material 221 and the join supporting portion 222a.

Figure 7:
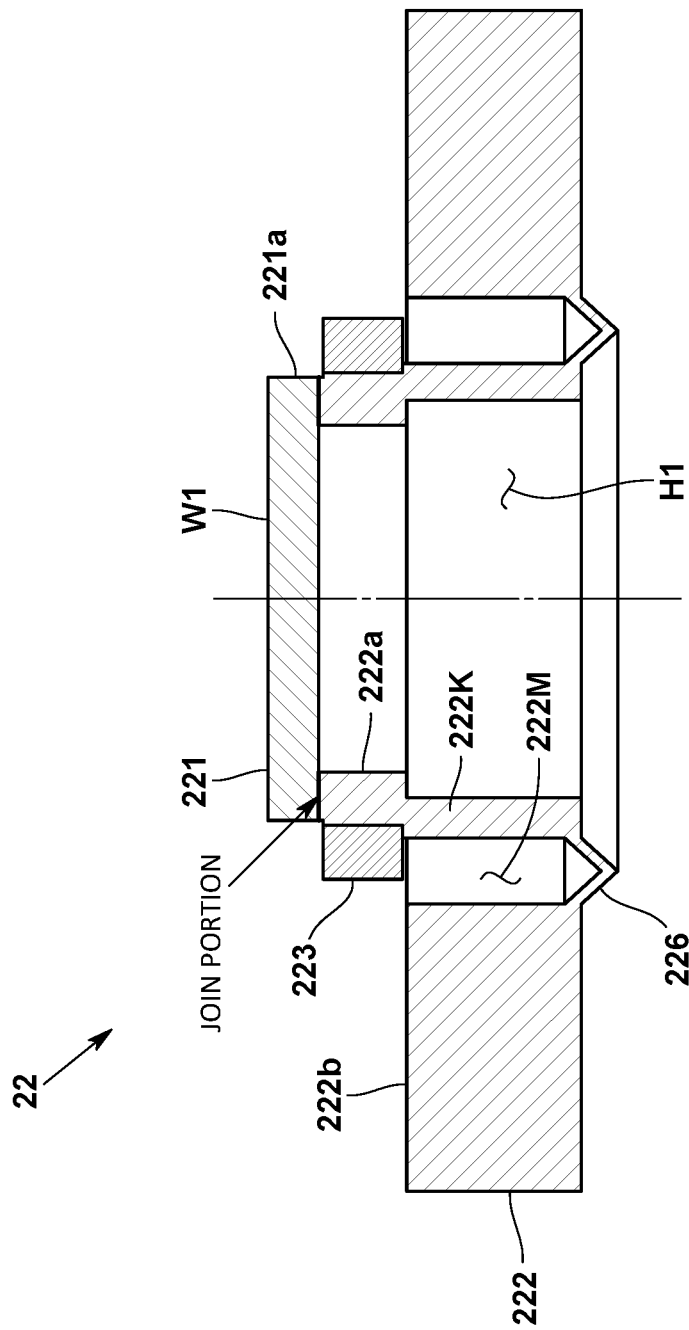
FIG. 7 is a cross-sectional view showing a structure of a window forming component of a variant embodiment.
Figure 8:
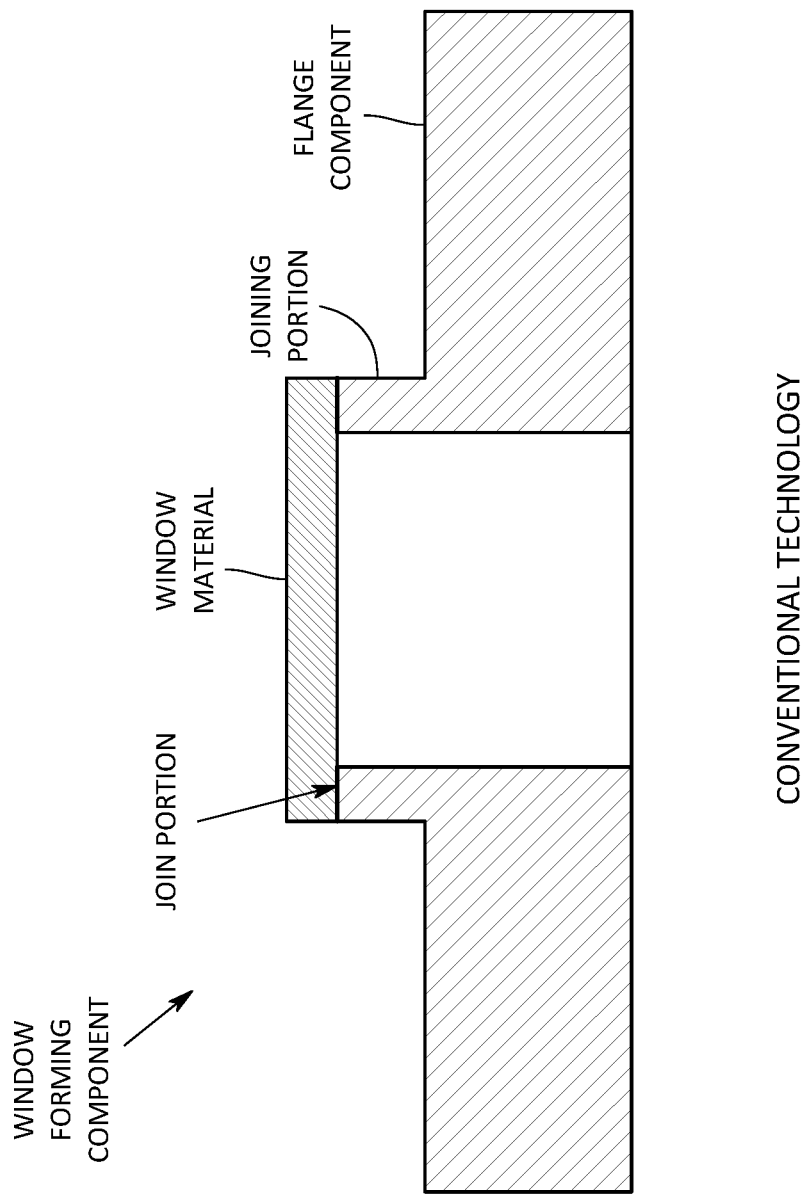
FIG. 8 is a cross-sectional view showing the structure of a conventional window forming component.

Furthermore, as is shown in FIG. 7, it is also possible for a thermal deformation absorption portion 226 to be provided in a bottom portion of the groove 222M in the flange portion 222b. This thermal deformation absorption portion 226 may be formed by a bent portion having at least one ridge portion or trough portion that is formed extending in the circumferential direction of the groove 222M. As a result of this thermal deformation absorption portion 226 being provided, it becomes possible to inhibit thermal stress that might be caused by the thermal expansion of the flange portion 22b from being generated in the join portion between the window material 221 and the join supporting portion 222a.

The optical measurement cell 2 of the above-described embodiments has a structure that includes the pair of translucent windows W1 and W2, however, it is also possible to employ a structure in which only one translucent window is provided. In this case, light both enters and exits via the single translucent window. In addition, it is also possible to employ a structure in which the optical measurement cell 2 is provided with three or more translucent windows.

In the above-described embodiments, the join supporting portion 222a is formed integrally with the flange portion 222b, however, it is also possible for these to be formed as mutually separate components.

The window material of the above-described embodiment is formed having a circular configuration when looked at in plan view, however, it is also possible for the window material to instead be formed having another configuration when looked at in plan view such as, for example, a rectangular configuration.

Moreover, the gas analysis device of the above-described embodiments employs a non-dispersive infrared absorption method (NDIR), however, it is also possible for this gas analysis device to instead employ a Fourier transform infrared spectroscopy method (FTIR), or an optical analysis method that employs light other than infrared light. In addition to devices that analyze a gas as the test sample, the optical analysis device of the present invention may instead be a device that analyzes a liquid.

Furthermore, it should be understood that the present invention is not limited to the above-described embodiments, and that various modifications and combinations and the like may be made thereto insofar as they do not depart from the spirit or scope of the present invention.

LIST OF REFERENCE CHARACTERS

100 . . . Gas Analysis Device (Optical Analysis Device)
2 . . . Optical Measurement Cell
3 . . . Light-Irradiating Portion
4 . . . Light-Detecting Portion
5 . . . Concentration Calculation Portion
W1, W2 Translucent Windows
221 . . . Window material
221a . . . Outer-Side Circumferential Surface
222a . . . Join Supporting Portion
222b . . . Flange Portion
222M . . . Annular Groove
222K . . . Inner-Side Wall Portion
223 . . . Low Thermal Expansion Component
224a . . . First Inclined Surface
224b . . . Second Inclined Surface
225 . . . Fixing Mechanism
226 . . . Thermal Deformation Absorption Portion

What is claimed is:

1. An optical measurement cell having translucent windows through which light is transmitted and into an interior of which is introduced a test sample, comprising:
   a planar window material that forms the translucent windows;
   a join supporting portion that is joined to an outer edge portion of a main surface of the window material and supports the window material; and
   a low thermal expansion component that is provided on an outer-side circumferential surface of the join supporting portion and whose coefficient of thermal expansion is lower than a coefficient of thermal expansion of the join supporting portion, so as to reduce a thermal stress generated in a join portion between the window material and the join supporting portion.

2. The optical measurement cell according to claim 1, wherein the low thermal expansion component is provided in such a way as to be in close contact with the outer-side circumferential surface of the join supporting portion.

3. The optical measurement cell according to claim 1, wherein the low thermal expansion component is fitted together with the outer-side circumferential surface of the join supporting portion.

4. The optical measurement cell according to claim 1, wherein
   the outer-side circumferential surface of the join supporting portion has a first inclined surface whose external dimensions progressively increase the further the first inclined surface is from the window material, and
   an inner-side circumferential surface of the low thermal expansion component has a second inclined surface that corresponds to the first inclined surface of the join supporting portion, and
   there is further provided a fixing mechanism that, in a state in which the first inclined surface of the join supporting portion and the second inclined surface of the low thermal expansion component are in close contact with each other, fixes the low thermal expansion component in position.

5. The optical measurement cell according to claim 1, further comprising a flange portion that is provided so as to be continuous with the join supporting portion in such a way as to surround the window material, wherein
   an annular groove is formed in a surface of the flange portion located on the join supporting portion side thereof so as to surround the join supporting portion.

6. The optical measurement cell according to claim 5, wherein a wall thickness of an inner-side wall portion that is located on an inner side of the groove in the flange portion is smaller than a wall thickness of the join supporting portion.

7. The optical measurement cell according to claim 5, wherein a thermal deformation absorbing portion is provided in a bottom portion of the groove in the flange portion.

8. The optical measurement cell according to claim 1, wherein the low thermal expansion component is not located on a side of the outer-side circumferential surface of the window material.

9. An optical analysis device comprising:
   the optical measurement cell according to claim 1;
   a light-irradiating portion that irradiates light onto the optical measurement cell;
   a light-detecting portion that detects light that has been transmitted through the optical measurement cell; and
   a concentration calculation portion that calculates concentrations of components contained in the test sample using light intensity signals obtained by the light-detecting portion.

* * * * *